United States Patent [19]

Hirayama

[11] Patent Number: 5,123,013
[45] Date of Patent: Jun. 16, 1992

[54] CELL SYNCHRONIZING APPARATUS AND METHOD

[75] Inventor: Kouji Hirayama, Fussa, Japan

[73] Assignee: Kabushiki Kaisha Toshiba, Kawasaki, Japan

[21] Appl. No.: 581,385

[22] Filed: Sep. 12, 1990

[30] Foreign Application Priority Data

Sep. 14, 1989 [JP] Japan .................. 1-239673

[51] Int. Cl.⁵ .............. H04J 3/06; H04J 3/24
[52] U.S. Cl. .................. 370/105.4; 370/94.1; 375/116
[58] Field of Search ........... 370/100.1, 105, 105.4, 370/105.5, 105.6, 106, 103, 60, 94.1; 375/114, 116, 108; 371/47.1

[56] References Cited

U.S. PATENT DOCUMENTS

| | | | |
|---|---|---|---|
| 4,002,845 | 1/1977 | Kaul et al. | 370/105.1 |
| 4,282,600 | 8/1981 | Zemanek | 370/105.1 |
| 4,573,171 | 2/1986 | McMahon et al. | 370/106 |
| 4,596,981 | 6/1986 | Ueno et al. | 370/105.4 |
| 4,622,666 | 11/1986 | Graves et al. | 370/105.1 |
| 4,747,116 | 5/1988 | Yajima et al. | 375/114 |

*Primary Examiner*—Douglas W. Olms
*Assistant Examiner*—H. Kizou
*Attorney, Agent, or Firm*—Finnegan, Henderson, Farabow, Garrett and Dunner

[57] ABSTRACT

A cell synchronizing apparatus and method for synchronizing the transmission and reception of a data train between switching systems. The data train is sectioned into a plurality of packeted data cells and synchronization cells of equal fixed length. A synchronization pattern is included in each synchronization cell. A time position of the synchronization pattern is detected and sequentially stored in a memory. Synchronization is determined from the relative positional relationship among time positions of equal value stored in the memory.

5 Claims, 6 Drawing Sheets

| ADDRESS DATA D2 | COUNT VALUES D3 |
|---|---|
| X | M |
| X+1 | M |
| X+2 | K |
| X+3 | M |
| X+4 | M |
| ⋮ | ⋮ |

FIG. 3

CELL SYNCHRONIZING APPARATUS AND METHOD

BACKGROUND OF THE INVENTION

1. Field of the Invention

This invention relates to packet transmission between packet switching systems and more particularly to a cell synchronizing apparatus and method for synchronizing packet switching systems using a synchronization cell.

2. Description of the Related Art

FIG. 4 shows one example of the structure of a packet switching system. In FIG. 4, a packet switching system 100 includes terminal interfaces 11, 12 and 13; a line interface 14; a controller 15; a control bus 16; and a data bus 17. Similarly, a packet switching system 200 includes terminal interfaces 21, 22 and 23; a line interface 24; a controller 25; a control bus 26; and a data bus 27. The packet switching systems 100 and 200 are connected by lines 18a and 18b. The packet switching system 100 has terminals 31, 32 and 33 connected therewith while the packet switching system 200 has terminals 41, 42 and 43 connected therewith.

In such arrangement, assume that, for example, telephone communication is made between the terminals 31 and 41 using the switching systems 100 and 200. Data transmitted by the terminal 31 is assembled as a data packet having a fixed length, namely, a data cell as shown in FIG. 5(a), at the terminal interface 11 of the switching system 100. The data cell 50 includes a destination address 51 and data 52. The address is added at the terminal interface 11. The data cell 50 is delivered to the line interface 14 via the data bus 17 of the switching system 100 and then to the line interface 24 of the called switching system 200 through the line 18a. The line interface 24 is synchronized with the line interface 14 such that a data cell can be extracted from an incoming train of data. In accordance with the destination address 51, the data cell extracted at the line interface 24 is sent via the data bus 27 to the terminal interface 21 where the data cell is transformed into a train of data, which is sent to the terminal 41.

A synchronization cell is sent from the line interface 14 to the line interface 24 via the line 18a for cell synchronization between the line interfaces 14 and 24. The synchronization cell 60 includes a predetermined synchronization pattern 61 as shown in FIG. 5(b). As seen in FIG. 5(b), synchronization cell 60 contains a single synchronization pattern 61 in a header portion of the synchyronization cell.

The synchronization cell(s) 60 is sent in such situations in which there is a time period during which no data cell 50 is sent as shown in FIG. 6(b) or after data cells are sent successively for a predetermined interval after the synchronization cell 60 is sent as shown in FIG. 6(a).

The line interface 24 detects the synchronization pattern of the synchronization cell to establish the cell synchronization. A conventional cell synchronization circuit has a structure as shown in FIG. 7. In FIG. 7, a synchronization pattern detector 71 detects the synchronization pattern 61 contained in the synchronization cell 60 from the received data D1 and outputs a synchronization pattern detection signal S1 upon detection of the synchronization pattern 61, is then applied through AND gates 72; 73 to a reset terminal R of a cell length counter 74 and has the effect of resetting counter 74. After being reset, the counter 74 is counted up by a clock CK and outputs a cell length count signal S2 each time it counts clocks corresponding to the length of the synchronization cell.

If the counter 74 is reset at the position of a correct synchronization pattern 61, the synchronization pattern detection signal S1 and the cell length count signal S2 appear at the same timing, so that the signal S2 closes AND gate 73 and no reset signal enters the counter 74. When the synchronization pattern detector 71 detects a predetermined number of successive synchronization patterns 61 at their correct positions, a synchronization protection unit 75 determines that synchronization is correctly established at that position. At such time, unit 75 outputs gate signal S3 which is effective to close the AND gate 72. That is, signal S3 has a logic value effective to prevent propagation of signal S1 through AND gate 72. As a result, no synchronization pattern detection signal S1 is applied through the AND gate 73 to the reset terminal R of the counter 74 and hence the counter 74 is not reset. The output of the synchronization protection unit 75 opens, i.e., renders conductive a NOR gate 76 and the cell length count signal S2 from the counter 74 is output as a synchronization signal S0.

If the counter reset does not occur at the position of the correct synchronization pattern, the timing at which the cell length count signal S2 closes, i.e., renders nonconductive, the AND gate 73 differs from the timing at which the reset signal appears and thus the counter 74 is again reset. That is, as seen in FIG. 7, signal S2 is inverted to prevent propagation of signal S1 through AND gate 73. These operations are repeated until the counter 74 is reset at the position of the correct synchronization pattern to thereby achieve the cell synchronization.

In this arrangement, even if the counter 74 is reset at the position of the correct synchronization pattern, a situation may occur in which the synchronization pattern detector 71 detects a synchronization pattern at a position other than the position of the correct synchronization pattern before the synchronization protection unit 75 determines that synchronization is maintained correctly at the position of the correct synchronization pattern. In that situation, the synchronization pattern detector 71 outputs the synchronization pattern detection signal S1 which will reset the counter 74 and the synchronization protection unit 75 without being blocked at the AND gate 73 by the cell length count signal S2. Thus, the processes of the establishment of synchronization is required from the beginning. This would undesirable increase at the time required for established of synchronization.

An attempt could be made which increases the length of bits used in the synchronization pattern to prevent the detection of a synchronization pattern at a position other than the position of the correct synchronization pattern. However, this process only reduces the possibility of detection of the synchronization pattern at a position other than the position of the correct synchronization pattern, but does not eliminate the possibility completely.

As mentioned above, if the conventional cell synchronization system detects a synchronization pattern at a position other than the position of the correct synchronization pattern during the transient interval from an asynchronous state to the establishment of synchronization, it resets the synchronization protection unit, so that the establishment of synchronization is required from the beginning to thereby increase the time required for establishment of synchronization undesirably.

SUMMARY OF THE INVENTION

It is an object of the present invention to provide a cell synchronization apparatus and method which prevents an increase in the time required for establishment of synchronization even if a synchronization pattern is detected at a position other than the position of the correct synchronization pattern.

In the order to achieve the above object, according to the present invention, there is provided a cell synchronization apparatus which transmits between packet switching systems a plurality of data cells having any fixed length and constituting a train of data and synchronization cells, each synchronization cell comprising a synchronization pattern. In the apparatus, a synchronization pattern is detected from a received train cells. The time position when the synchronization pattern is extracted is stored in a memory at that time. The establishment of synchronization is detected from the relative positional relationship between the time positions thus stored sequentially in the memory.

Thus, according to the present invention, even if a synchronization pattern is detected at a position other than the position of the correct synchronization pattern, establishment of synchronization is brought about without resetting the synchronization protection unit to thereby prevent a time required for establishment of synchronization from increasing unnecessarily.

BRIEF DESCRIPTION OF THE DRAWINGS

FIG. 3 illustrates the operation of the embodiment;

DETAILED DESCRIPTION OF THE PREFERRED EMBODIMENTS

Figure 1:
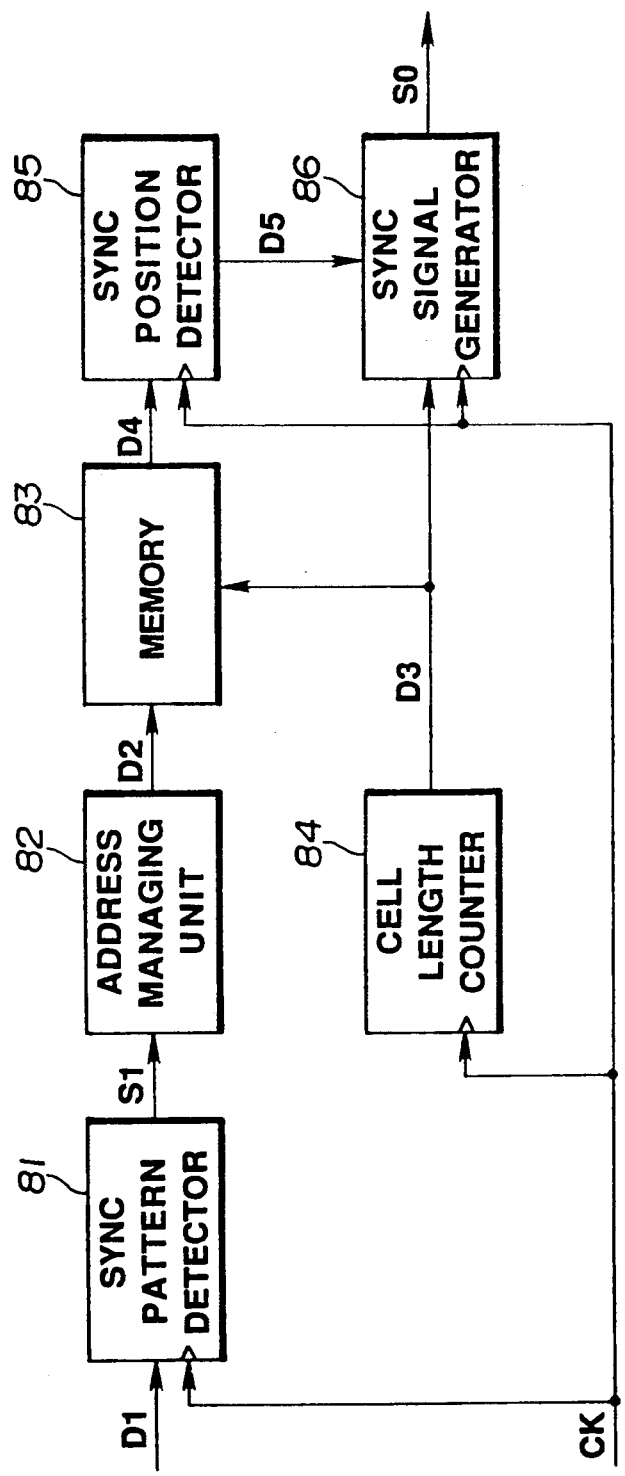
FIG. 1 is a circuit diagram of one embodiment of the present invention.
Figure 4:
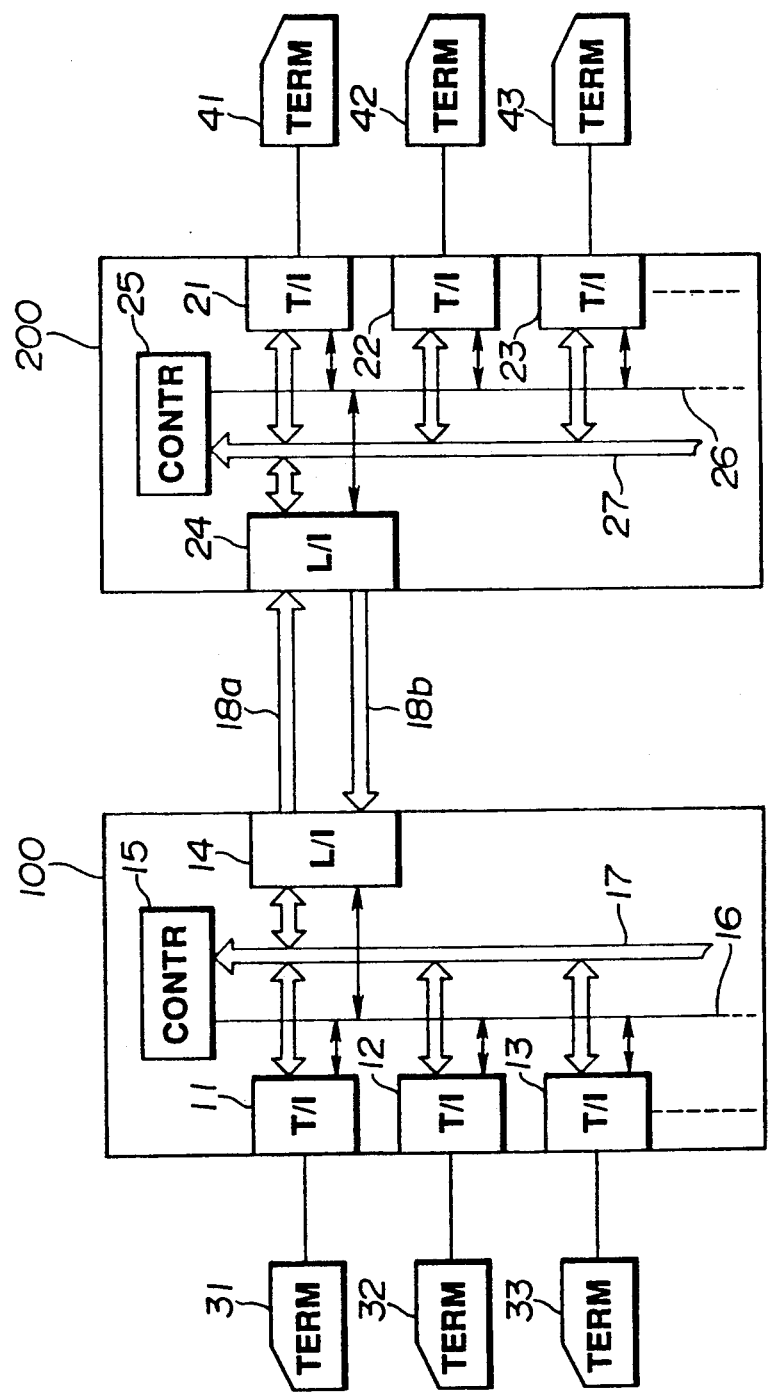
FIG. 4 is a block diagram of packet switching sytems.
Figure 5:
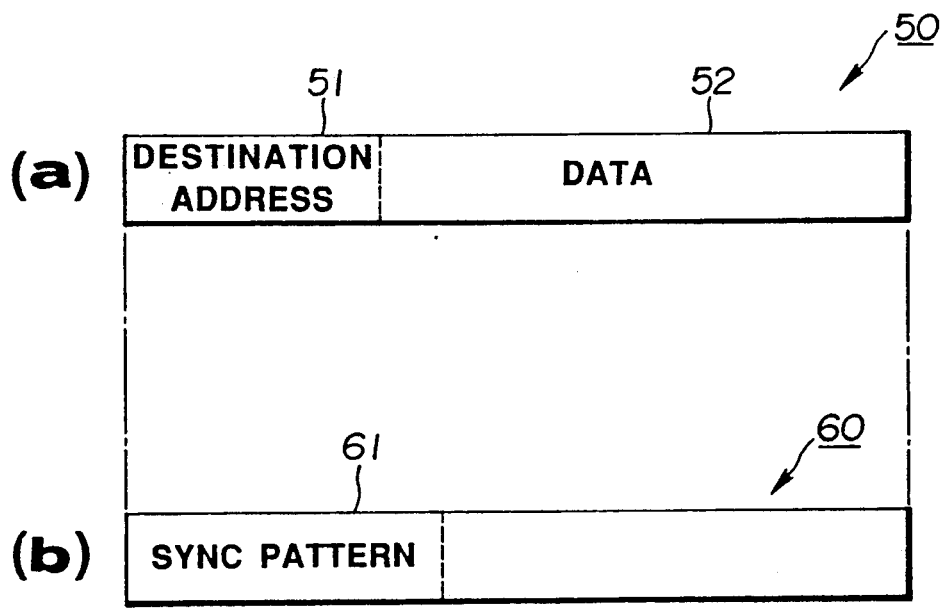
FIG. 5 shows a data format indicative of one example of a data cell and a synchronization cells.
Figure 6:
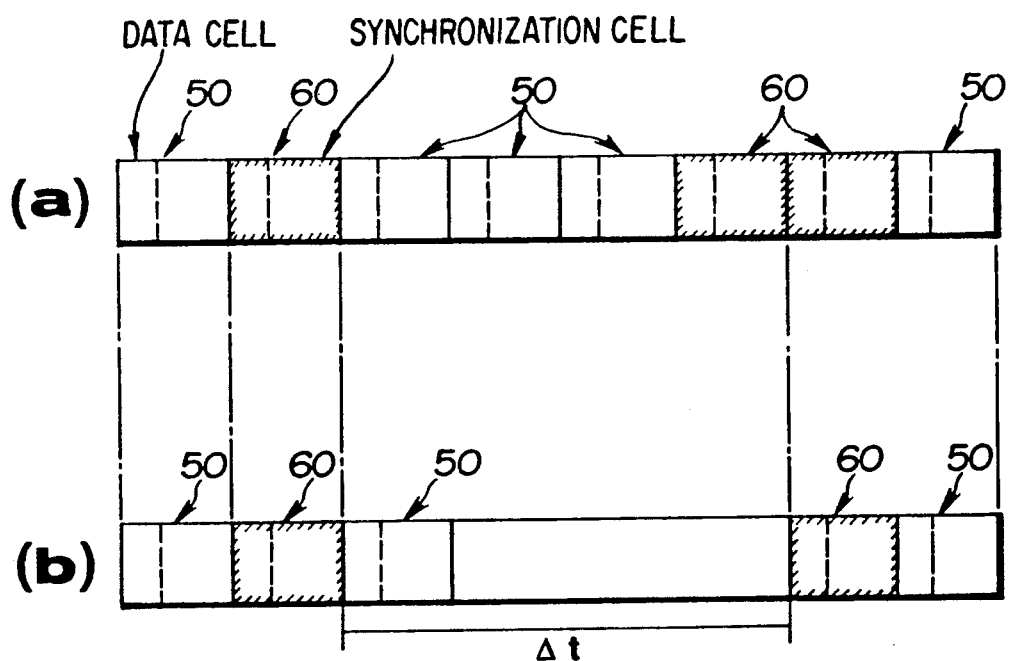
FIG. 6 is a view of an illustrative inserted synchronization cell.
Figure 7:
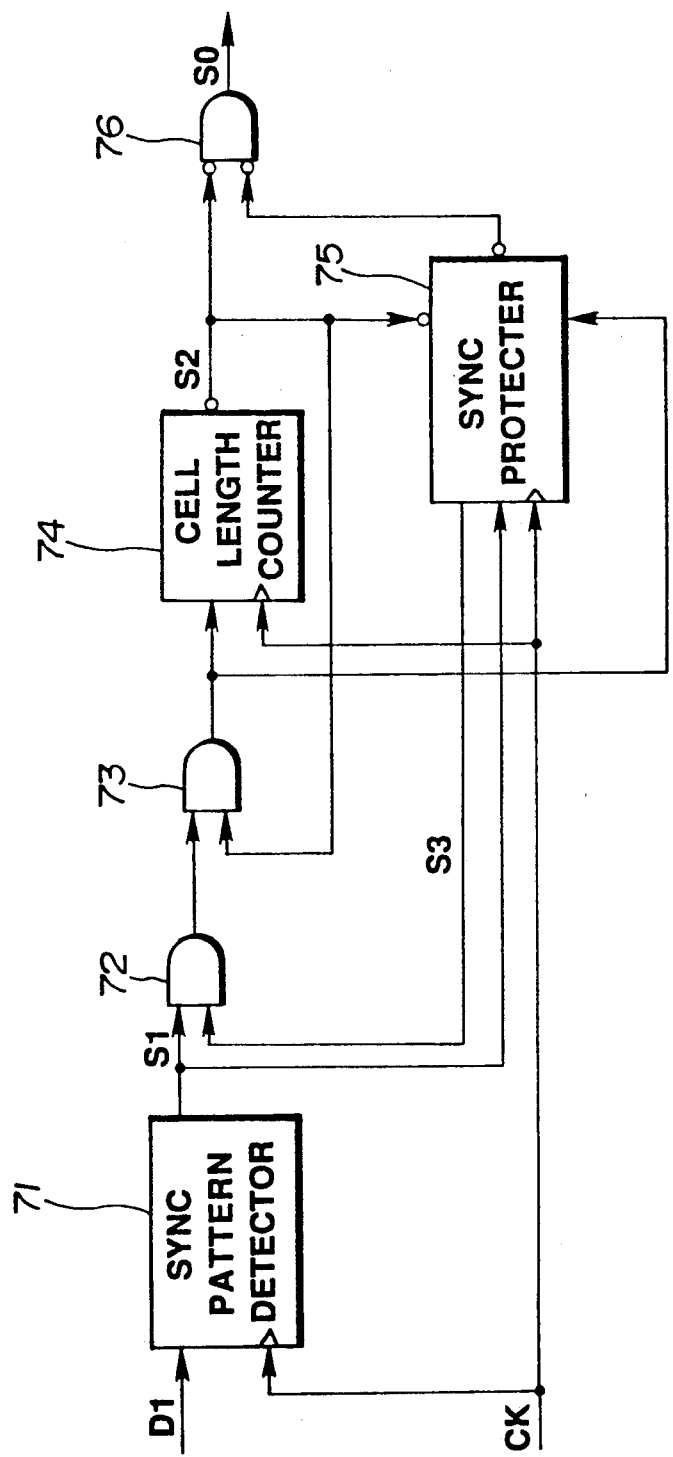
FIG. 7 is a circuit diagram of a conventional synchronization detector.

FIG. 1 shows one embodiment of a synchronization circuit to which a cell synchronization apparatus and method according to the present invention is appled. The synchronization circuit corresponds to the conventional synchronization circuit of FIG. 7 and is provided, for example, in line interfaces 14, 24 of FIg. 4. In FIG. 1, a synchronization pattern detector 81 detects the synchronization pattern 61 in synchronization cell 60 from data D1 received through a line 18a or 18b and outputs a synchronization pattern detection signal S1 at the timing of detection of each synchronization pattern. The signal S1 is applied to an address managing unit 82 which manages the addresses in memory 83 to be described next and outputs address data D2 which designates a predetermined address which, for example, increments each time the unit 82 receives a synchronization pattern detection signal S1.

The memory 83 sequentially writes the counts or data D3 output by a cell length counter 84 at addresses designated by address data D2 from the address managing unit 82. The counter 84 is driven by a clock CK and returns to its initial value when it counts up to a value corresponding to the length of a cell and then restarts to count. It repeats such operation.

Therefore, the count of the cell length counter 84 is written into the memory 83 at the timing when the synchronization pattern detector 81 detects the synchronization pattern 61 and generates a synchronization pattern signal S1. If the timing (time position) when the synchronization pattern 61 is detected coincides with the position of the correct synchronization pattern, the same value is written into each successive address in the memory 83 as generated by unit 82. If otherwise, a value written into one location of the memory differs from a value written into another location. However, if cell synchronization is maintained, the value corresponding to the correct synchronization pattern is again written into memory at the timing when the next synchronization pattern 61 is detected.

FIG. 3 shows such situation. In FIG. 3, X, X+1, X+2. X+3, X+4... show successive pieces of address data D2 from the address managing unit 82 and M, M, K, M, M... show the counts of the cell length counter 84, namely, pieces of data D3. In the data D3, for example, the timing of M corresponds to a correct detection of a synchronization pattern while the timing of K corresponds to an incorrect detection of a pattern.

In the particular embodiment, arrangement is such that if at least a predetermined number of the same values of data D3 are written into memory 83, the synchronization position detector 85 of the next stage determines that synchronization is established. This does not imply that at least a predetermined number of the same values appears successively. Even if a different value of data D3 appears due to incorrect detection of a synchronization pattern, the detector 85 does not immediately determine that synchronization is out of order. Detector 85 determines that synchronization is established if the predetermined number or more of the same values appears as a result without the requirement that the predetermined number of same values of D3 occur successively. For example, as shown in FIG. 3, if a predetermined number or more of Ms corresponding to the correct synchronization patterns 61 is detected, the detector 85 determines that synchronization is established even if, for example, K corresponding to an incorrect synchronization pattern intervenes between any adjacent Ms.

The synchronization position detector 85 receives as data D4 the counts of the cell length counter 84 written in the memory 83 determines whether synchronization is established on the basis of the data D4. One example of determination of the detector 85 is shown as a flowchart in FIG. 2 in which the value n is first reset to 0 (step 91). Then it is checked whether new address data piece is received (step 92). If so, it is checked whether the new data is the same as the last data piece (step 93). If so, the same counts of the cell length counter are determined as being written successively into the memory 83 and the value n is incremented by one to become a new value n (step 95). In this case, the value n becomes 0+1=1.

If it is determined that the new data piece is not the same as the last one at step 93, it is checked whether the received data piece is the same as the data piece before the last data piece (step 94). If the new data piece differs also from the data piece before the last data piece, execution returns to step 91 to reset the value n and restarts from the beginning. While a value different from the last one is written into the memory 83 if the new data piece is determined to be the same as the data piece before the last data piece at step 94, the new data piece is determined as having the sameness as the data piece before the last data piece and execution passes to step 95 where the value n is incremented by one to become a new value n.

It is then checked whether the value n has arrived at a preset value N, for example, of 5 (n≧N) (step 96). If n≧N does not hold, execution returns to step 92, which is repeated until n≧N holds at step 96.

If n≧N holds at step 96, it is determined that cell synchronization is established and data indicative of synchronization position, namely, data indicative of the count of the cell length counter 84 written into the memory 83 and corresponding to the position of the correct synchronization pattern is sent as data D5 (step 97).

Referring again to FIG. 1, synchronization position data D5 output from the synchronization position detector 85 after establishment of synchronization is applied to the synchronization signal generator 86 so as to be set in the generator.

The synchronization signal generator 86 receives data D3 from the cell length counter 84. When the synchronization position data D5 is set, the output data D5 is compared with the output data D3 from the counter 84. Each time both coincide, a synchronization signal SO is output.

According to such arrangement, extraction of synchronization patterns at successive positions of correct synchronization patterns is not a necessary condition for the establishment of synchronization. If a predetermined number of the same values set for the synchronization protection is detected, establishment of synchronization is attained, so that a time required for establishment of synchronization does not increase unnecessarily.

Figure 2:
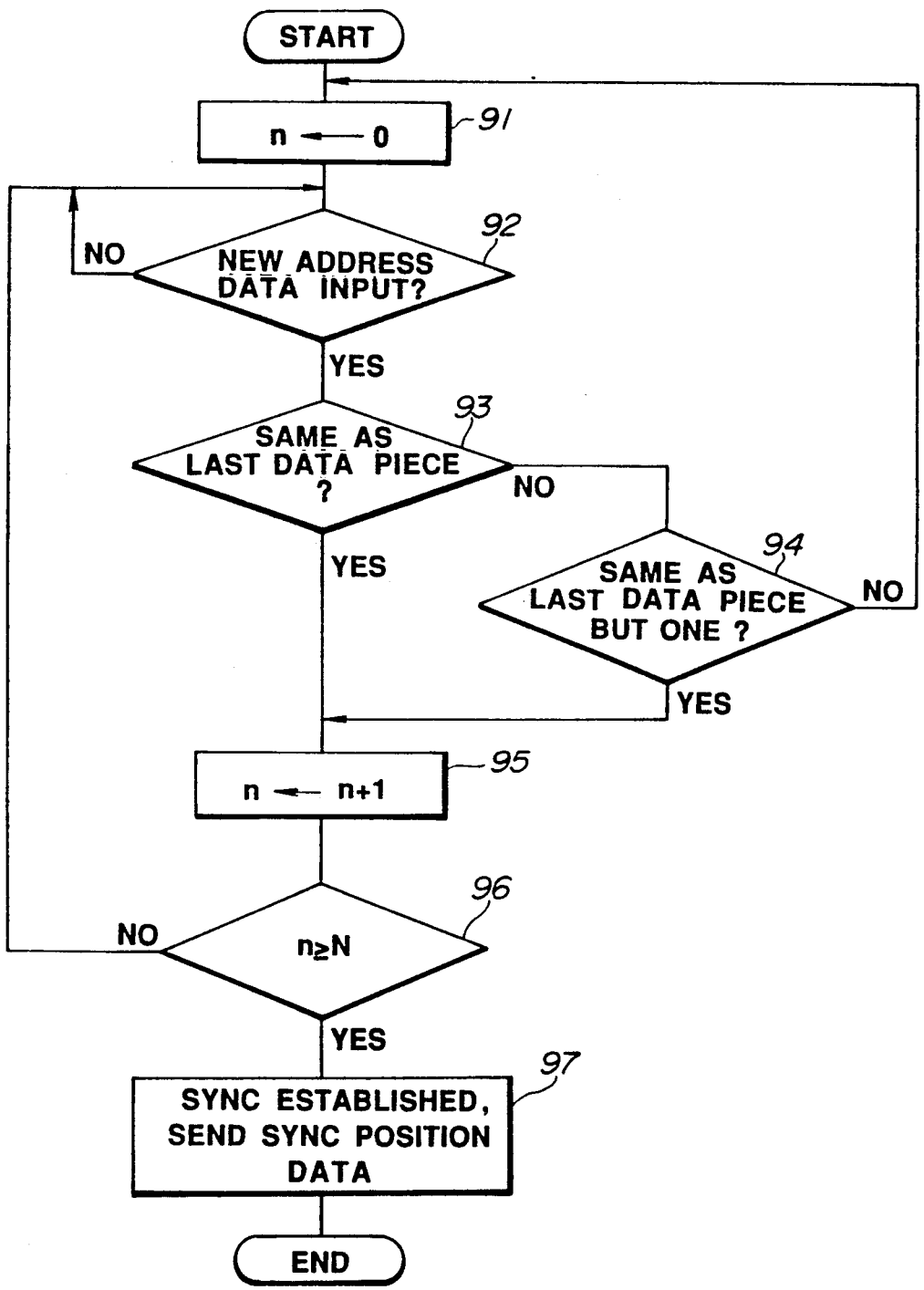
FIG. 2 is a flowchart indicative of the operation of the embodiment.

While in the flowchart of FIG. 2 arrangement is such that it is checked whether the new data piece coincides with the last data piece or the data piece before the last data piece, arrangement may be such that if there is a probability that two or more incorrect synchronization patterns will be detected between the detection of a correct synchronization pattern and the detection of the next correct synchronization pattern, it is checked whether the new data coincides with the data piece two or more before the last data piece.

Alternatively, arrangement may be such that if a number of the same counter values equal to or larger than a predetermined number are written into the memory 83 in a predetermined time, it is determined that synchronization is established.

What is claimed is:

1. A cell synchronizing apparatus in a packet switching system for transmitting and receiving a train of cells, said train composed of data cells of a fixed length including data to be transmitted and at least one synchronization cell having the same length as the data cells of the fixed length and including a synchronization pattern, said synchronization pattern having a pattern length, the synchronization cell being inserted between the data cells of the fixed length, said apparatus comprising:

means for detecting the synchronization pattern of the synchronization cell in a received cell train;

counter means for repeatedly outputting sequentially changing values of numeral data in a period corresponding to the fixed length of the synchronization cell;

memory means for storing said values of the numeral data outputted from the counter means each time the synchronization pattern is detected by the synchronization pattern detecting means; and synchronization detecting means for generating a synchronization timing when the number of numeral data having equal values stored in the memory means is at least a predetermined number.

2. A cell synchronizing apparatus according to claim 1, wherein the counter means counts a clock signal having a predetermined frequency, returns to its initial value when a count value of the counter means arrives at a value corresponding to the fixed length of the synchronization cell, and counts the clock signal again, whereby the counter means performs its counting operation repeatedly.

3. A cell synchronizing apparatus according to claim 2, wherein said values of the numeral data outputted from the counter means are count values of the counter means, and said memory means stores said count values at successive addresses each time the synchronization pattern detecting means detects the synchronization pattern.

4. A cell synchronizing apparatus according to claim 3, wherein the synchronization detecting means increments an index by one when the value stored in the memory means coincides with a value stored in an immediately preceding address in the memory means or a value stored in an address in the memory means one before the immediately preceding address and said synchronization detecting means detects the detection timing of the synchronization pattern detecting means as the synchronization timing when a current value of the index arrives at a predetermined number.

5. A cell synchronizing method in a packet switching system for transmitting and receiving a train of cells, said train of cells composed of data cells of a fixed length including data to be transmitted and at least one synchronization cell having the same length as the data cells of the fixed length and including a synchronization pattern, said synchronization pattern having a pattern length, the synchronization cell being inserted between the data cells of the fixed length, comprising the steps of:

detecting the synchronization pattern of the synchronization cell from a received cell train;

repeatedly outputting sequentially changing values of numeral data in a period corresponding to the fixed length of the synchronization cell;

sequentially storing said values of the numeral data outputted in the repeatedly outputting step each time the synchronization pattern is detected in the synchronization pattern detecting step; and incrementing an index when the value of numeral data stored in a current storing step coincides with the value of numeral data stored in an immediately previous storing step or the value of numeral data stored in the storing step preceding the immediately previous storing step; and outputting a detection timing in response to the detecting step as a synchronization timing when the index arrives at a predetermined number.

* * * * *